(12) United States Patent
Li et al.

(10) Patent No.: US 11,601,597 B2
(45) Date of Patent: *Mar. 7, 2023

(54) DUAL-CAMERA DEVICE AND TERMINAL DEVICE

(71) Applicant: Huawei Technologies Co., Ltd., Shenzhen (CN)

(72) Inventors: Juan Li, Shenzhen (CN); Deliang Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,791

(22) Filed: Aug. 3, 2021

(65) Prior Publication Data

US 2021/0368103 A1 Nov. 25, 2021

Related U.S. Application Data

(63) Continuation of application No. 16/347,144, filed as application No. PCT/CN2017/109151 on Nov. 2, 2017, now Pat. No. 11,108,960.

(30) Foreign Application Priority Data

Nov. 3, 2016 (CN) .......................... 201610956637.7

(51) Int. Cl.
| | |
|---|---|
| *H04N 5/232* | (2006.01) |
| *G03B 13/36* | (2021.01) |
| *H04M 1/02* | (2006.01) |
| *H04N 5/225* | (2006.01) |
| *H04N 5/247* | (2006.01) |

(52) U.S. Cl.
CPC ......... *H04N 5/23287* (2013.01); *G03B 13/36* (2013.01); *H04M 1/0264* (2013.01);
(Continued)

(58) Field of Classification Search
CPC .. H04N 5/23287; H04N 5/2253; H04N 5/247; H04N 5/2258; H04N 5/2251;
(Continued)

(56) References Cited

U.S. PATENT DOCUMENTS

| | | | |
|---|---|---|---|
| 10,015,384 B2 * | 7/2018 | Bachar | ..................... G02B 7/09 |
| 2003/0147101 A1 | 8/2003 | Wendel | |

(Continued)

FOREIGN PATENT DOCUMENTS

| | | |
|---|---|---|
| CN | 101331385 A | 12/2008 |
| CN | 204741393 U | 11/2015 |

(Continued)

*Primary Examiner* — Yogesh K Aggarwal
(74) *Attorney, Agent, or Firm* — Conley Rose, P.C.

(57) ABSTRACT

A dual-camera device includes a first camera and a second camera, where the first camera includes a first motor, and the first motor includes at least one first Hall effect sensor, where the second camera includes a second motor, the second motor and the first motor are disposed in parallel, the second motor includes N second coils and N second magnets, the second coils are configured to levitate and support the second magnets during power-on, N is a positive integer and is a multiple of four. A distance between a first disposition location of the first Hall effect sensor and a second disposition location of the second magnets in the second motor is greater than or equal to a first preset distance.

19 Claims, 10 Drawing Sheets

Open-loop control system

Closed-loop control system

(52) U.S. Cl.
CPC ........... *H04N 5/2253* (2013.01); *H04N 5/247* (2013.01); *H04M 2250/12* (2013.01); *H04M 2250/52* (2013.01)

(58) Field of Classification Search
CPC ................ G03B 13/36; H04M 1/0264; H04M 2250/12; H04M 2250/52
See application file for complete search history.

(56) References Cited

U.S. PATENT DOCUMENTS

| | | |
|---|---|---|
| 2009/0045807 A1 | 2/2009 | Nishida et al. |
| 2017/0094183 A1 | 3/2017 | Miller et al. |
| 2017/0235094 A1 | 8/2017 | Osaka et al. |

FOREIGN PATENT DOCUMENTS

| | | |
|---|---|---|
| CN | 105785547 A | 7/2016 |
| CN | 205665451 U | 10/2016 |
| CN | 106357990 A | 1/2017 |
| CN | 206077561 U | 4/2017 |
| EP | 1472569 | 11/2004 |
| EP | 3486718 A1 | 5/2019 |
| JP | 2008139458 A | 6/2008 |
| JP | 2016038444 A | 3/2016 |
| JP | 2016180836 A | 10/2016 |
| WO | 03067325 A1 | 8/2003 |
| WO | 2008099642 A1 | 8/2008 |
| WO | 2016156996 A1 | 10/2016 |

\* cited by examiner

DUAL-CAMERA DEVICE AND TERMINAL DEVICE

CROSS-REFERENCE TO RELATED APPLICATIONS

This application is a continuation of U.S. patent application Ser. No. 16/347,144, filed on May 2, 2019, which is a U.S. National Stage of International Patent Application No. PCT/CN2017/109151 filed on Nov. 2, 2017, which claims priority to Chinese Patent Application No. 201610956637.7 filed on Nov. 3, 2016, all of which are hereby incorporated by reference in their entireties.

TECHNICAL FIELD

This application relates to the communications field, and more specifically, to a dual-camera device and a terminal device.

BACKGROUND

Currently, application of a dual camera in a mobile phone is increasingly popularized. A dual camera usually includes two motors with a focus function. The motor measures and determines magnetic field intensity by disposing a Hall (Hall) effect sensor to determine a location of a lens, so as to implement focusing. In addition, a camera with a stabilization function is increasingly popularized, and the stabilization function is mainly implemented by using four magnets and four coils used to levitate and support the magnets in a power-on state.

However, when a motor with a stabilization function is disposed in a dual-camera mobile phone, a strong magnetic field is generated by magnets and coils in a power-on state, and further strong magnetic interference is generated to a Hall effect sensor in another motor.

In the prior art, the magnetic interference caused by the motor with the stabilization function in the dual-camera mobile phone to the Hall effect sensor in the another motor is avoided by using software. However, this causes deterioration of photographing experience (for example, a focus time). Therefore, a solution capable of reducing magnetic interference caused by a motor with a stabilization function in a dual camera to a motor with an autofocus function is urgently expected, to improve user experience.

SUMMARY

Embodiments of this application provide a dual-camera device and a terminal device, so that magnetic interference caused by a motor with a stabilization function to a Hall effect sensor in another motor can be reduced, and user experience can be improved.

According to a first aspect, a dual-camera device is provided, including: a first camera, where the first camera includes a first motor, and the first motor includes at least one first Hall effect sensor; and a second camera, where the second camera includes a second motor, the second motor and the first motor are disposed in parallel, the second motor includes N second coils and N second magnets, the second coils are configured to levitate and support the second magnets during power-on, N is a positive integer, and N is a multiple of 4. A distance between a first disposition location of the first Hall effect sensor in the first motor and a second disposition location of the second magnets in the second motor is greater than or equal to a first preset distance.

The distance between the Hall effect sensor in the first motor and the magnets in the second motor is greater than or equal to a first preset threshold, so that magnetic interference caused to the Hall effect sensor in the first motor by a magnetic field generated by the magnets in the second motor and the coils supporting the magnets in a power-on state is reduced, and user experience is improved.

In some possible implementations, the first motor further includes K first magnets and an autofocus AF coil, the AF coil is in a ring shape, the K first magnets are placed opposite to each other along an outer wall of the ring shape, K is a positive integer, and K is a multiple of 2.

The first motor may be an AF motor, and the second motor is a motor with a stabilization function. This reduces impact exerted on a focus function of the AF motor by the second motor, and reduces a focus time.

In some possible implementations, the first motor further includes M first coils and M first magnets, the first coils are configured to levitate and support the first magnets during power-on, M is a positive integer, and M is a multiple of 4; the second motor further includes at least one second Hall effect sensor, and a distance between a third disposition location of the second Hall effect sensor in the second motor and a fourth disposition location of the first magnets in the first motor is greater than or equal to a second preset distance.

In this embodiment of this application, locations of a Hall effect sensor and a magnet are laid out in one motor and locations of a Hall effect sensor and a magnet are laid out in another motor, to reduce magnetic interference between the two motors, and user experience is improved.

In some possible implementations, the first motor further includes an AF coil, the AF coil is in a ring shape, and the M first magnets are placed pairwise opposite to each other around an outer wall of the ring shape.

Locations of a Hall effect sensor and a magnet are laid out in an OIS motor and locations of a Hall effect sensor and a magnet are laid out in another motor, to reduce magnetic interference between the OIS motor and the motor with a stabilization function, so as to improve a focus function and a stabilization function of the OIS motor, and improve the stabilization function of the another motor.

In some possible implementations, the second motor further includes an AF coil, the AF coil is in a ring shape, and the N second magnets are placed pairwise opposite to each other around an outer wall of the ring shape.

Locations of a Hall effect sensor and a magnet are laid out in one OIS motor and locations of a Hall effect sensor and a magnet are laid out in another OIS motor, to reduce magnetic interference between the two OIS motors, and respectively improve focus functions and stabilization functions of the two OIS motors.

In some possible implementations, the first magnets are bipolar magnets.

Bipolar magnets may be used for the first motor to implement more desirable magnetic non-leakage, so that magnetic interference caused by the first motor to the Hall effect sensor in the second motor can be further reduced, and focus performance of the second motor can be improved.

In some possible implementations, the second preset distance is a maximum value that can be reached by the distance between the third disposition location and the fourth disposition location.

When a layout inside a motor is compact, the second preset distance may be configured as a maximum distance between the disposition location of the second Hall effect sensor and the location of the first magnets. In this way, interference caused by the first motor to the second Hall effect sensor can be reduced as much as possible.

In some possible implementations, the second preset distance is 5 mm.

When space inside a motor permits, a second preset threshold may be set to 5 mm, so that interference between the second Hall effect sensor and the first magnets is effectively reduced.

In some possible implementations, the first preset distance is a maximum value that can be reached by the distance between the first disposition location and the second disposition location.

When a layout inside a motor is compact, the first preset distance may be configured as a maximum distance between the disposition location of the first Hall effect sensor and the location of the second magnets. In this way, magnetic interference caused by the second motor to the first Hall effect sensor can be reduced as much as possible.

In some possible implementations, the first preset distance is 5 mm.

When space inside a motor permits, the first preset threshold may be set to 5 mm, so that interference caused by the second motor to the first Hall effect sensor is effectively reduced.

In some possible implementations, the second magnets are bipolar magnets.

Bipolar magnets may be used for the second motor to implement more desirable magnetic non-leakage, so that magnetic interference caused by the second motor to the Hall effect sensor in the first motor can be further reduced.

In some possible implementations, a housing material of the first motor is SUS304 or SUS315.

The housing material of the first motor may use a weak magnetic material or a non-magnetic material, so that magnetic interference caused by the first motor to the second motor is further reduced.

In some possible implementations, a housing material of the second motor is SUS304 or SUS315.

The housing material of the second motor may also use a weak magnetic material or a non-magnetic material, so that magnetic interference caused by the second motor to the first motor is further reduced.

According to a second aspect, a terminal device is provided, including the dual-camera device in any one of the first aspect and the possible implementations.

Based on the foregoing technical solutions, the distance between the Hall effect sensor in the first motor and the magnets in the second motor is set to be greater than or equal to the first preset threshold in the embodiments of this application, so that magnetic interference caused to the Hall effect sensor in the first motor by the magnetic field generated by the magnets in the second motor and the coils supporting the magnets in a power-on state is reduced, and user experience is improved.

DESCRIPTION OF EMBODIMENTS

The following describes the technical solutions in the embodiments of this application with reference to the accompanying drawings in the embodiments of this application.

For ease of understanding the embodiments of this application, the following elements are first described before the embodiments of this application are described.

A working principle of an autofocus (Autofocus, AF) motor is: A coil inside the motor is powered on to generate a magnetic field, a lens is moved based on magnetic force, and the AF motor measures and determines magnetic field intensity by using a Hall effect sensor to determine a location of the lens, moves the location of the entire lens by using a micro-distance, and controls a focal length, to implement clearness of an image. The AF motor mainly includes a voice coil motor, a stepper motor, liquid lens focus, a memory alloy motor, liquid crystal lens focus, and the like, and a most commonly used drive mechanism is the voice coil motor (Voice Coil Motor, VCM).

Figure 1:
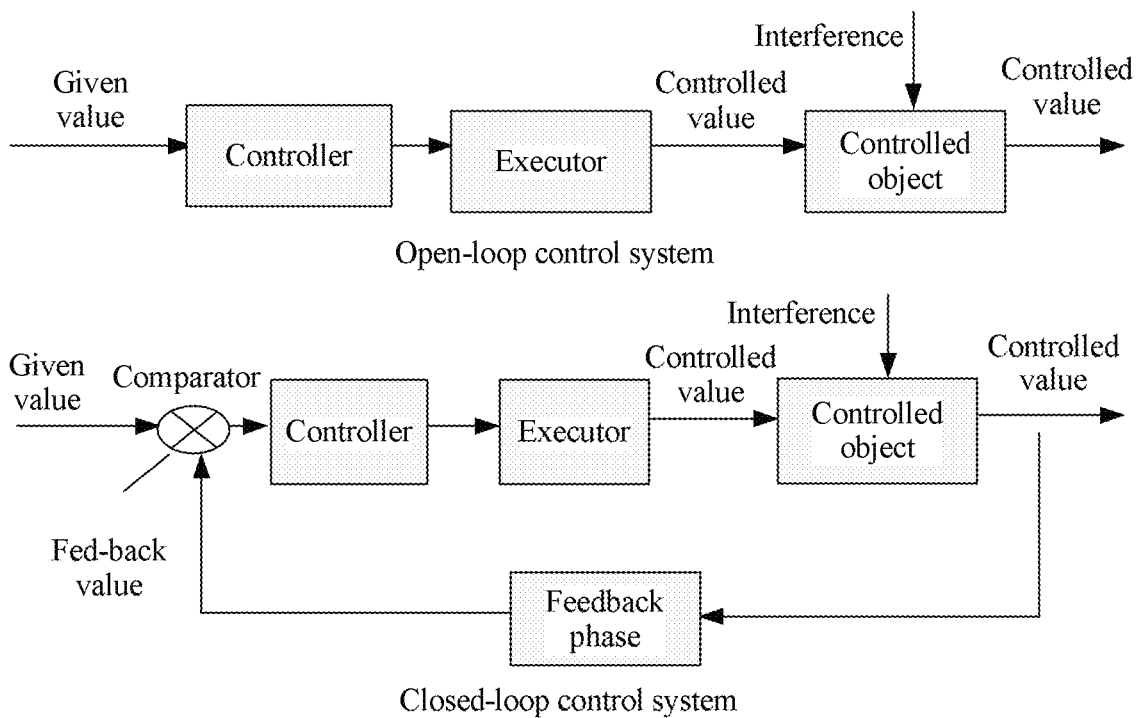
FIG. 1 is a schematic flowchart of an open loop and a closed loop.

FIG. 1 is a flowchart of an open loop and a closed loop. The open loop has a simple structure and low costs, works stably, and has a relatively good control effect when an input signal and input disturbance can be known in advance. However, an offset of a controlled value cannot be automatically corrected, and an element parameter change in a system and external unknown disturbance affect control precision.

The closed loop has a capability of automatically correcting an offset of a controlled value by using feedback control, can correct an error caused by an element parameter change and external disturbance, and has high control precision. A closed-loop AF motor implements the foregoing function by using a Hall effect sensor, and the Hall effect sensor may measure and determine a Gaussian value in a magnetic field, so that a location of a lens can be further measured and determined. Specifically, magnetic field intensity at locations of 0 and max of the lens is sensed by using the Hall effect sensor and is stored in a driver. Magnetic field intensity at a movement location can also be measured during motion of a focus lens set, and the intensity is returned to the driver. The driver obtains a positive or negative error based on the returned value, and then controls a moving direction and a moving speed of the focus lens set by using the positive or negative error. In this way, focus may be performed relatively precisely and quickly.

Figure 2:
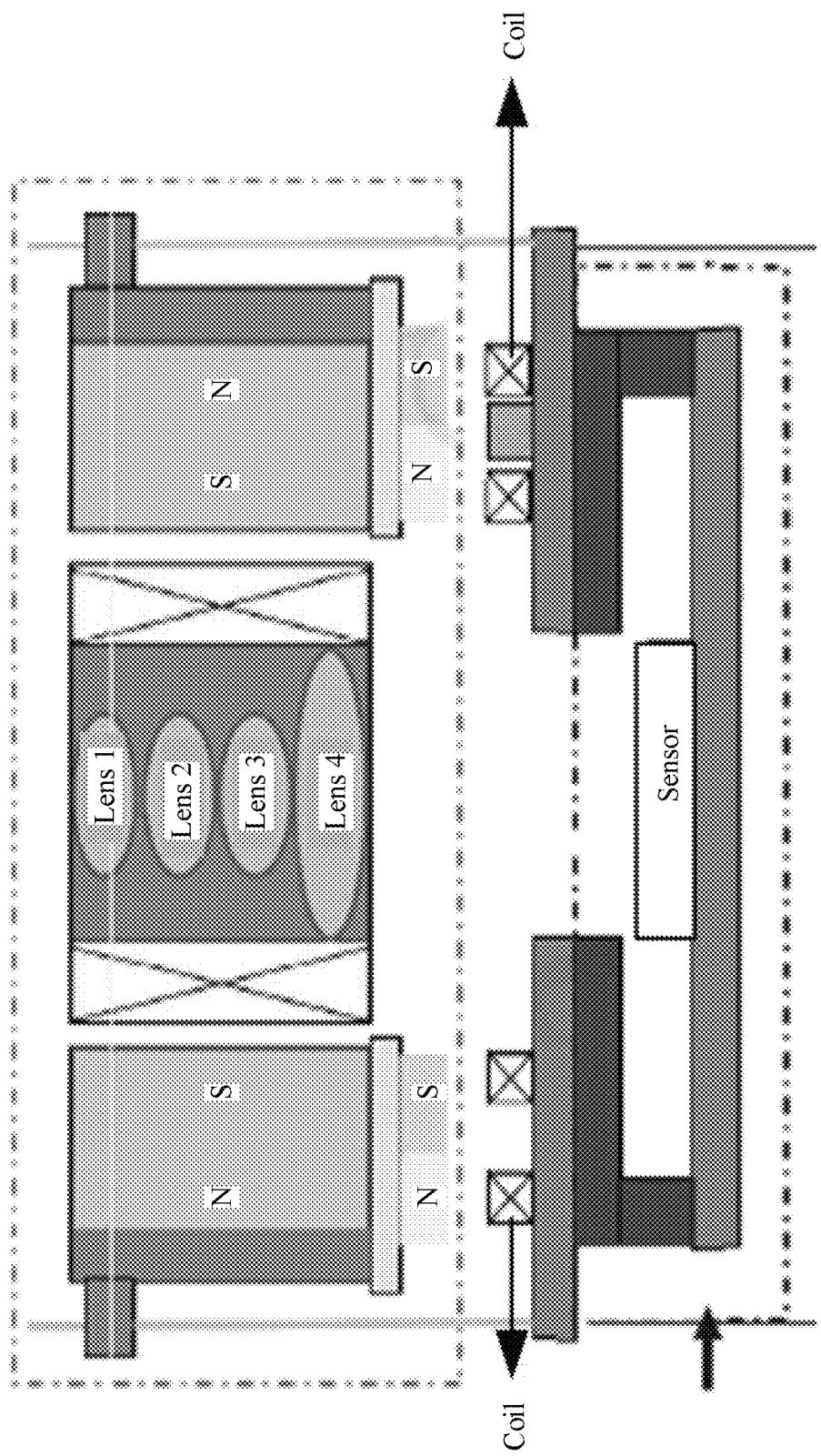
FIG. 2 is a schematic structural diagram of levitating and supporting magnets by coils in an optical image stabilization (optical image stabilization, OIS) motor.

An autofocus function of an OIS motor is implemented by an AF coil and two magnets opposite to each other. An OIS function is implemented by a lens levitation body (shown in FIG. 2) including four pairwise opposite magnets and four OIS coils. The OIS motor mainly includes a translation-type OIS focus motor and a shaft-moving-type focus motor. Principles of the two OIS motors are the same, to be specific, a lens is controlled to translate relative to an image sensor, so that an image offset caused by hand jitter is cancelled and compensated for. A type of the OIS motor is not limited in this embodiment of this application.

In conclusion, the AF motor adjusts a focal length through movement in a vertical direction, and the OIS motor not only can move a lens in the vertical direction, but also can move a lens in a horizontal direction. A gyroscope built in a terminal device converts jitter information into an electrical signal and sends the electrical signal to an OIS control driver. The OIS control driver drives a motor to control motion of a levitation lens to compensate for impact generated by jitter. The Hall effect sensor feeds back location information of the lens to the OIS control driver, to form complete closed-loop control.

Figure 3:
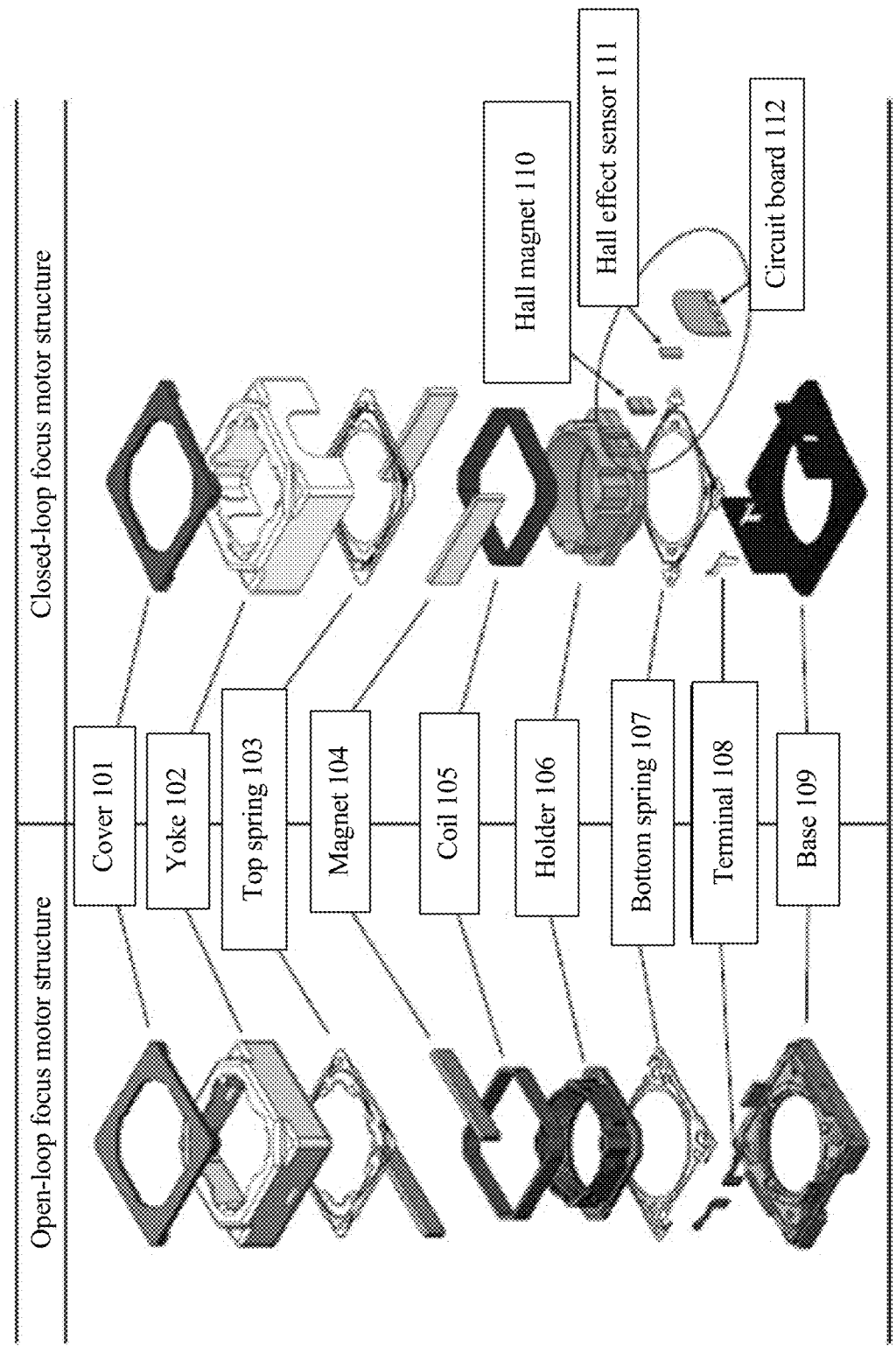
FIG. 3 is a diagram of an internal structure of an autofocus (Autofocus, AF) motor.

FIG. 3 is a diagram of an internal structure of an autofocus (AF) motor. AF motors are further classified into an open-loop (open-loop) AF motor and a closed-loop (close loop) AF motor. The open-loop AF motor includes a cover 101 (cover), a yoke 102 (yoke), a top spring 103 (spring-top), a magnet 104 (magnet), a coil 105 (coil), a holder 106 (holder), a bottom spring 107 (spring-btm), a terminal 108 (terminal), and a base 109 (base). The closed-loop AF motor differs from the open-loop AF motor in that a bottom spring further includes a Hall magnet 110 (magnet Hall element), a Hall effect sensor 111 (Hall element), and a flexible circuit board 112 (FPC). It should be understood that the AF motor further includes a motor housing.

According to an autofocus principle, a lens is relatively remarkably moved by using a motor, to determine image contrast. A specific focus process includes the following steps:

(1) When focus is not performed, an entire image of a focus point is in a defocus state.

(2) Focus starts, the lens starts to move, the image gradually becomes clear, and the contrast starts to rise.

(3) In a focus state, the image is the clearest with highest contrast, but this is unknown by a mobile phone; therefore, the lens continues to move.

(4) The lens continues to move to find that the contrast starts to decrease; the lens is further moved to find that the contrast further decreases, and the mobile phone knows that the focus point is already missed.

(5) The lens is moved back to a location with the highest contrast, to complete focus.

Figure 4:
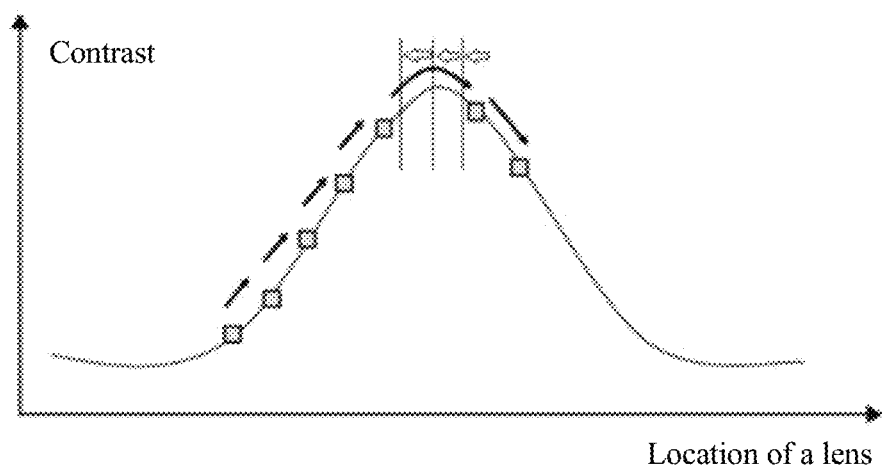
FIG. 4 is a schematic diagram of a focus principle of an AF motor.

FIG. 4 shows the focus principle. The figure describes the focus process. After two clearest areas are found by moving a lens, the lens is then slightly moved in the two areas to find a clear focus point. The motor moves the lens by using Ampere's force, and a fixed magnetic field and a coil through which a variant current runs are needed.

Figure 5:
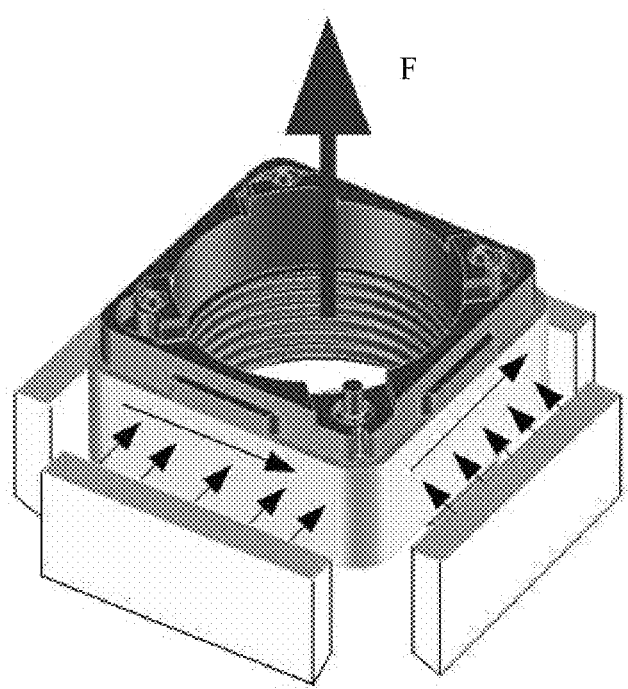
FIG. 5 is a schematic diagram of force-bearing of an AF motor.

A working principle of an autofocus motor is: In a permanent magnetic field, a stretching location of a spring plate is controlled by changing a value of a direct current in a coil inside the motor, to drive the lens to move up and down. For example, an autofocus work force-bearing situation shown in FIG. 5 is: $F=IL*B \sin \alpha$ and $Fi=fs+gL$, where F is Ampere's force, fs is elastic force of a spring, and gL is gravity of the lens.

Figure 6:
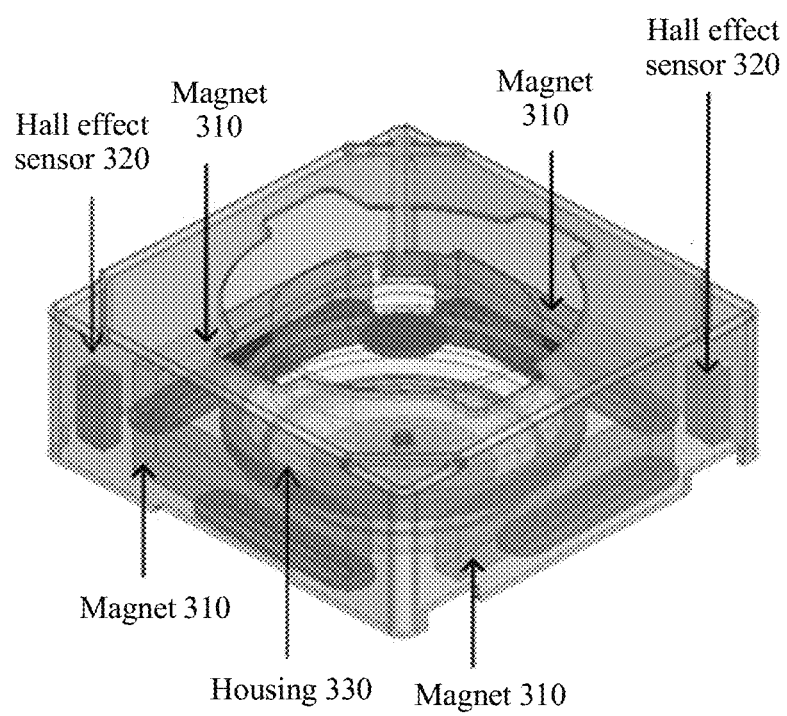
FIG. 6 is a schematic structural diagram of an OIS motor.

The OIS motor has an autofocus function of the AF motor, and further has a stabilization function. The OIS motor usually includes four magnets 310 and Hall effect sensors 320 in an X-axis direction and in a Y-axis direction, and/or Hall effect sensors 320 and a housing 330 that are in a Z-axis direction. The housing usually uses an aluminum material. FIG. 6 is a structural diagram of an OIS motor. Four magnets are fastened to a yoke around a periphery. After power-on, magnetic force is generated by a magneto and a coil, to push a lens carrier to move. Two Hall effect sensors in a Z-axis direction, four magnets, and a housing are included in FIG. 6. The Hall effect sensors in the X-axis direction and in the Y-axis direction are configured to detect magnetic field changes in the X direction and in the Y direction, and the Hall effect sensors in the Z-axis direction are configured to detect a magnetic field change in the Z-axis direction.

Figure 7:
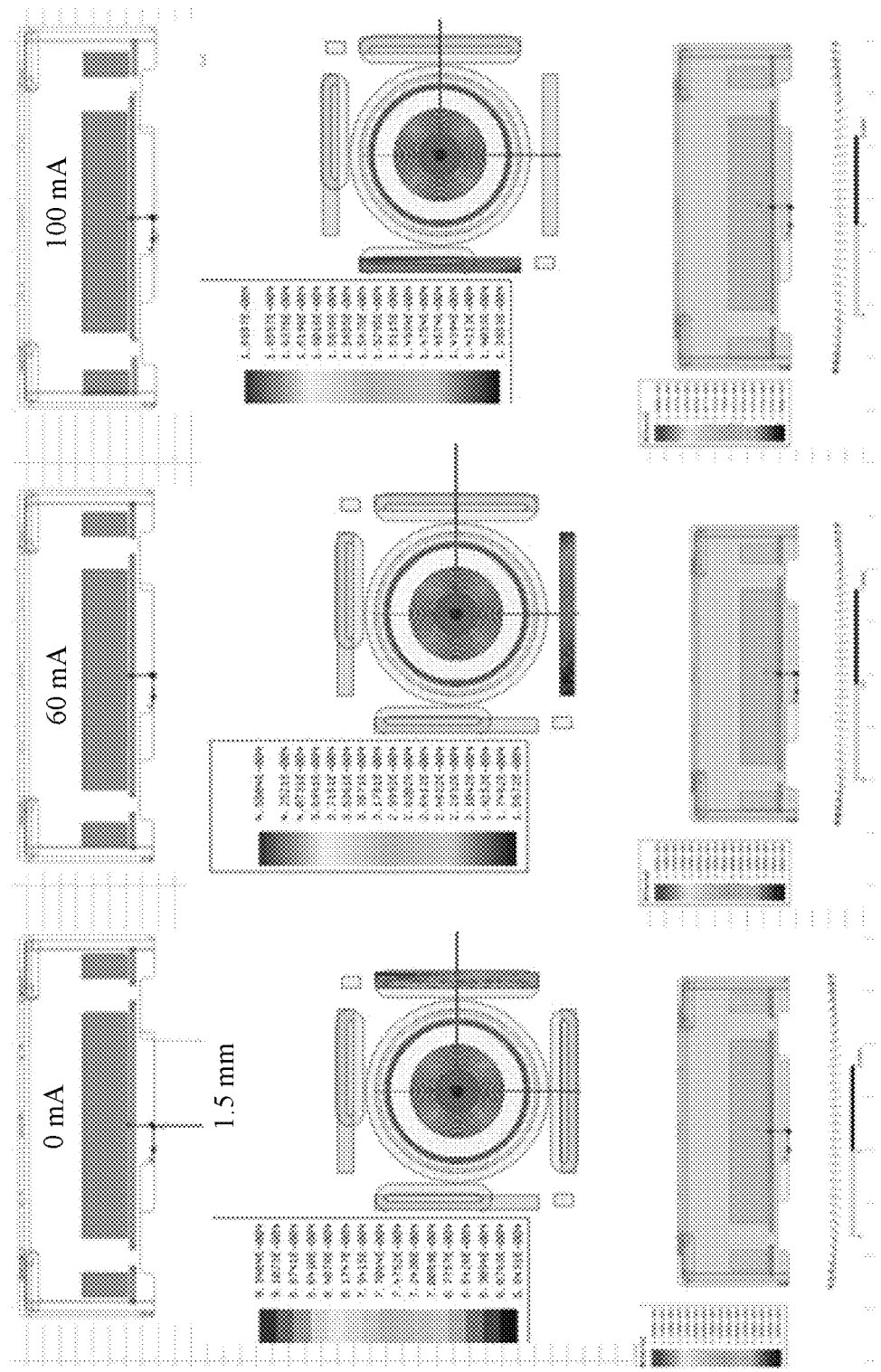
FIG. 7 is a schematic diagram of magnetic field intensity generated by an OIS motor in a power-on state.

One of two motors in a dual-camera device in the prior art has a stabilization function, and the other motor determines a location of a lens by measuring and determining magnetic field intensity by using a Hall effect sensor, to implement focus. The Hall effect sensors 320 and the magnets 104 are disposed at random, and a corresponding coil is disposed under each magnet. Therefore, when the coil is powered on, strong magnetic interference is caused to the Hall in the AF motor by magnetic field force generated by the magnet and the coil. Consequently, a focus speed and stabilization performance of photographing deteriorate. For example, FIG. 7 shows the magnetic force generated by the coil and the magnet changes as a current in a powered-on coil in the OIS motor changes. To be specific, the magnetic force generated by the coil and the magnet increases as the power-on current increases from 0 mA to 100 mA.

Figure 8:
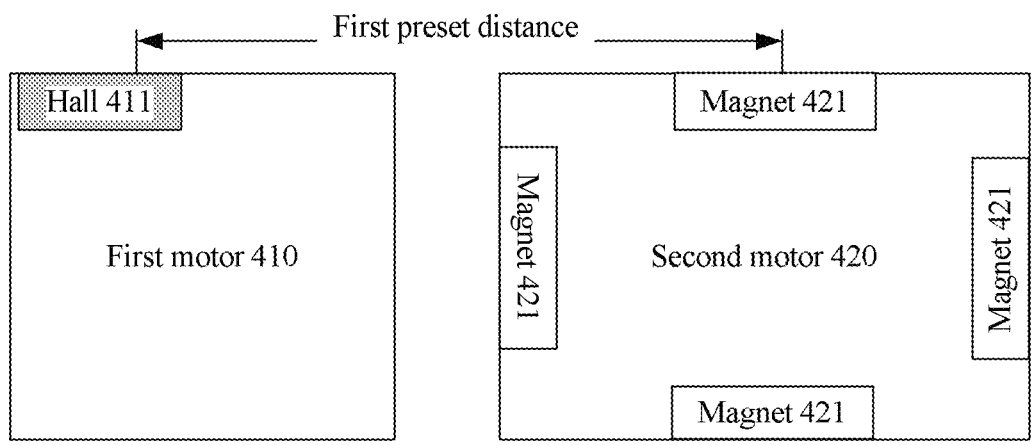
FIG. 8 is an elevational view of a motor structure of a dual-camera device according to an embodiment of this application.

FIG. 8 is an elevational view of a motor structure of a dual-camera device according to an embodiment of this application. As shown in FIG. 8, the dual-camera device includes: a first camera, where the first camera includes a first motor, and the first motor includes at least one first Hall effect sensor; and a second camera, where the second camera includes a second motor, the second motor and the first motor are disposed in parallel, the second motor includes N second coils and N second magnets, the second coils are configured to levitate and support the second magnets during power-on, N is a positive integer, and N is a multiple of 4. A distance between a first disposition location of the first Hall effect sensor in the first motor and a second disposition location of the second magnets in the second motor is greater than or equal to a first preset distance.

Specifically, the first motor 410 includes the at least one first Hall effect sensor, and the second motor 420 includes the N second magnets and the N second coils (that is, OIS coils). N is greater than 4 and is a multiple of 4. A specific quantity may be determined based on a module size in the motor, a distance between the two cameras, and the like. This is not limited in this application.

As shown in FIG. 8, for ease of description, an example in which the first motor 410 includes one first Hall effect sensor 411 and the second motor 420 includes four second magnets 421 and four second coils (the coils are under the magnets, and this is not shown in FIG. 8) is used for description. The first Hall effect sensor 411 is disposed in the first motor 410, the second magnets 421 are disposed in the second motor 420, and the distance between the first disposition location and the second disposition location is greater than or equal to the first preset distance. Specifically, the sensors and the magnets may be laid out based on a magnetic field between the two motors, a sensitive area of the magnetic field is determined, and the disposition location of the Hall effect sensor in the first motor and the disposition location of the magnets in the second motor are laid out by using the magnetic sensitive area.

It should be understood that the first preset distance may alternatively be determined based on factors such as sizes of internal space of the two motors (to be specific, the first preset distance is less than or equal to a maximum distance between internal components of the two motors) and measured data, or may be set at delivery or may be set by a user based on a requirement. This is not limited in this application.

It should be further understood that the distance between the first disposition location and the second disposition location in FIG. 8 may be a distance between a center of the Hall effect sensor 411 and a center of the magnets 421, may be a maximum distance between a left edge of the Hall effect sensor 411 and a right edge of the magnets 421, may be a minimum distance between a right edge of the Hall effect sensor 411 and a left edge of the magnets 421, may be a distance between a left edge of the Hall effect sensor 411 and a left edge of the magnets 421, or the like. This is not limited in this application. In addition, for ease of description, an example in which the Hall effect sensor 411 and the magnets 421 are on a same plane is used for description in this application. However, this application is not limited thereto.

It should be noted that if the first motor includes a plurality of first Hall effect sensors, and the second motor includes a plurality of second magnets, the distance between the first disposition location and the second disposition location may be a minimum value of a distance between a location of the plurality of first Hall effect sensors in the first motor and a location of the plurality of second magnets in the second motor.

It should be understood that there is usually a gap between the two motors in the dual-camera device. The gap may be configured based on actual application, and is usually set to be less than 1.5 mm. This is not limited in this application.

It should be further understood that mutual impact with another device in the dual-camera device should be further considered for the disposition location of the Hall effect sensors and the disposition location of the magnets in the motors. This is not limited in this embodiment of this application.

Therefore, for the dual-camera device in this embodiment of this application, the distance between the Hall effect sensor in the first motor and the magnets in the second motor is set to be greater than or equal to the first preset threshold, so that magnetic interference caused to the Hall effect sensor in the first motor by the magnetic field generated by the magnets in the second motor and the coils supporting the magnets in a power-on state is reduced, and user experience is improved.

Figure 9:
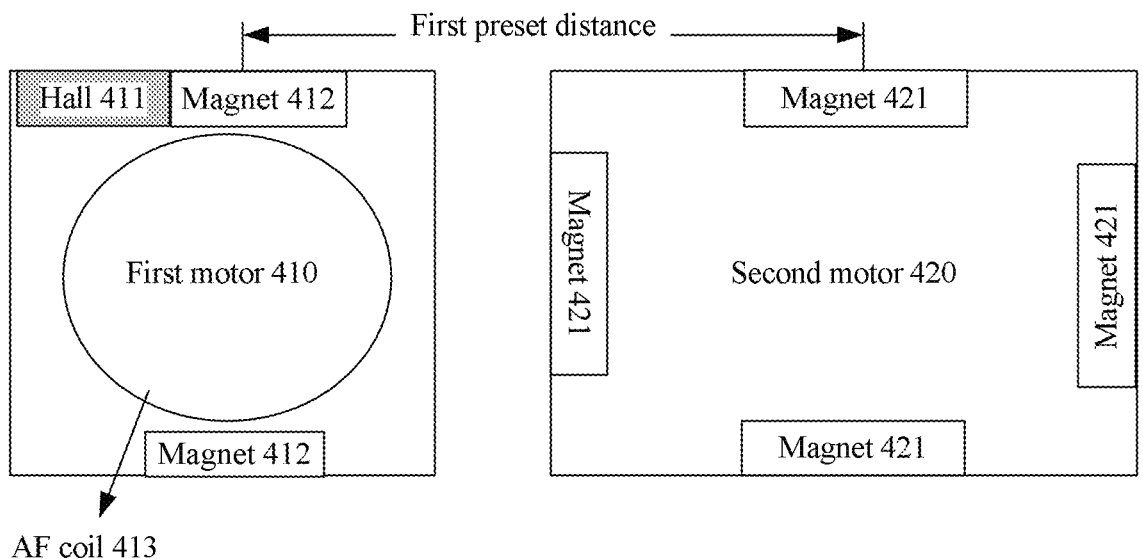
FIG. 9 is an elevational view of a motor structure of a dual-camera device according to another embodiment of this application.

Optionally, the first motor further includes K first magnets 412 and an AF coil 413, the AF coil 413 is in a ring shape, the K first magnets 412 are placed opposite to each other along an outer wall of the ring shape, K is a positive integer, and K is a multiple of 2. In this case, the first motor may be considered as an AF motor, and the second motor has a stabilization function. For example, as shown in FIG. 9, FIG. 9 is a schematic diagram of an example in which K is 2.

It should be noted that a quantity of Hall effect sensors in each direction may be determined based on a factor such as a module size in a motor. This is not limited herein in this application.

Optionally, the first preset distance is a maximum value that can be reached by the first disposition location and the second disposition location.

Specifically, when a layout inside a motor is compact, the first preset distance may be configured as a maximum distance between the disposition location of the first Hall effect sensor and the location of the second magnets. In this way, magnetic interference caused by the second motor to the first Hall effect sensor can be reduced as much as possible.

Optionally, when space inside a motor permits, the first preset threshold may be set to 5 mm, so that magnetic interference caused by the second motor to the first Hall effect sensor is effectively reduced.

Optionally, the second magnets are bipolar magnets.

Figure 10:
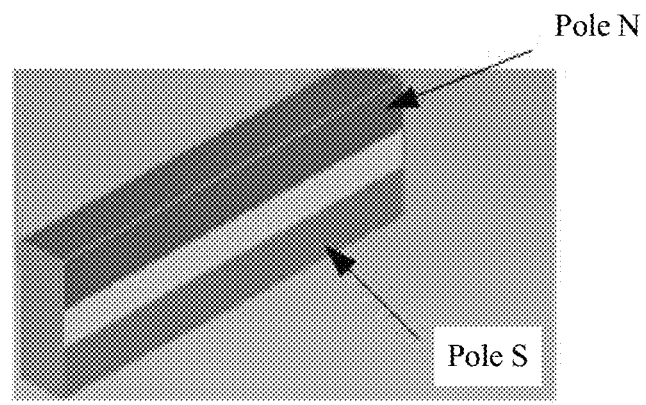
FIG. 10 is a schematic diagram of a bipolar magnet according to an embodiment of this application.

Specifically, the second motor may use a bipolar magnet (shown in FIG. 10). There are two polarities on one surface of the bipolar magnet, and different from divergence of a unipolar magnet, an external magnetic field of the bipolar magnet is limited. Therefore, more desirable magnetic non-leakage can be implemented, so that magnetic interference caused by the second motor to the Hall effect sensor in the first motor can be further reduced.

It should be understood that all or some of the plurality of second magnets included in the second motor may be bipolar magnets. This is not limited in this application. For example, if the second motor includes four magnets that may be placed pairwise symmetrically. Two magnets that are symmetrically placed are configured as bipolar magnets, and the other two symmetrical magnets are common magnets.

Optionally, a housing material of the first motor is SUS304 or SUS315.

Specifically, the housing material of the first motor may use a weak magnetic material or a non-magnetic material, so that magnetic interference caused by the first motor to the second motor is further reduced. For example, the housing material may be SUS304, SUS315, or the like. The weak magnetic material or the non-magnetic material is not limited in this application.

Optionally, the first motor further includes M first coils and M first magnets, the first coils are configured to levitate and support the first magnets during power-on, M is a positive integer, and M is a multiple of 4. The second motor further includes at least one second Hall effect sensor, and a distance between a third disposition location of the second Hall effect sensor in the second motor and a fourth disposition location of the first magnets in the first motor is greater than or equal to a second preset distance.

Figure 11:
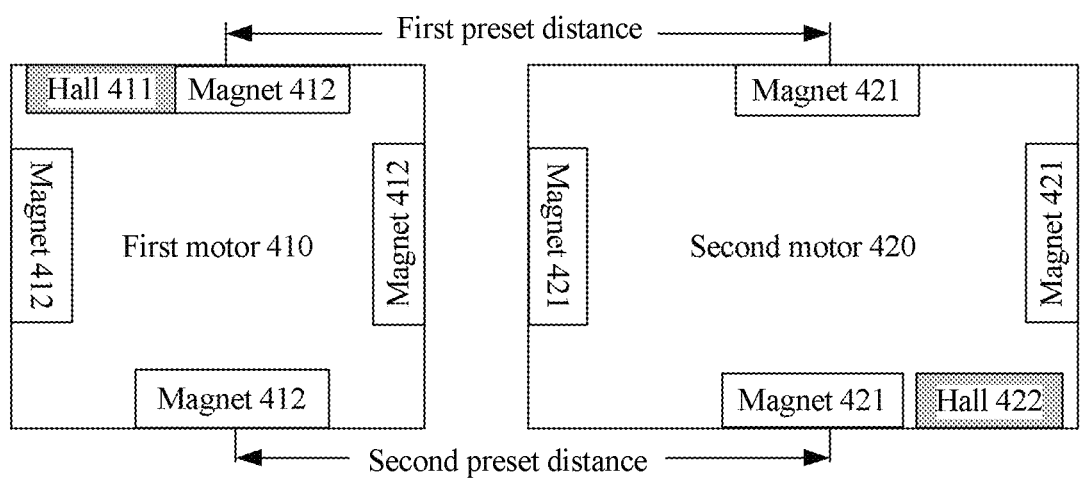
FIG. 11 is an elevational view of a motor structure of a dual-camera device according to another embodiment of this application.

Specifically, if the first motor further includes the M first magnets and the M first coils (that is, OIS coils), the first motor also has a stabilization function. The second motor further includes the second Hall effect sensor, to be specific, the second motor also determines a location of a lens by detecting, measuring, and determining magnetic field intensity by using the Hall effect sensor. In this way, to avoid strong magnetic interference caused to the second Hall effect sensor by a magnetic field generated by the first magnets and the first coils, a distance between a third disposition location at which the first magnets are disposed in the first motor and a fourth disposition location at which the second Hall effect sensor is disposed in the second motor is greater than or equal to a second preset distance. As shown in FIG. 11, the first motor 410 further includes four magnets 412 and the Hall effect sensor 411, the second motor 420 further includes the Hall effect sensor 422, and a distance between the Hall effect sensor 422 and the magnets 412 is greater than or equal to the second preset distance.

It should be understood that the second preset distance may be the same as the first preset distance. Details are not described herein again. Alternatively, the second preset distance may be different from the first preset threshold. This is not limited in this application.

It should be further understood that magnetic interference between a Hall effect sensor and a magnet in a same motor may be calibrated during calibration of a production line because a module is a fixed value.

Optionally, the first motor further includes an AF coil, the AF coil is in a ring shape, and the M first magnets are placed pairwise opposite to each other around an outer wall of the ring shape. In this case, the first motor may be considered as an OIS motor, and the second motor has a stabilization function.

Optionally, the second motor further includes an AF coil, the AF coil is in a ring shape, and N second magnets are placed pairwise opposite to each other around an outer wall of the ring shape. In this case, both the first motor and the second motor may be OIS motors, in other words, both the two cameras have a stabilization function and a focus function.

Optionally, the second preset distance is a maximum value that can be reached by the third disposition location and the fourth disposition location.

Specifically, when a layout in a motor is compact, the second preset distance may be configured as a maximum distance between the disposition location (which is indicated as the third location) of the second Hall effect sensor and the disposition location (which is indicated as the fourth location) of the first magnets. In this way, interference caused by the first motor to the second Hall effect sensor can be reduced as much as possible.

Optionally, when space inside a motor permits, a second preset threshold may be set to 5 mm, so that interference between the second Hall effect sensor and the first magnets is effectively reduced.

Optionally, the first magnets may be bipolar magnets, and the first magnets may be the same as or different from the second magnets. This is not limited in this application.

It should be understood that all or some of the M first magnets included in the first motor may be bipolar magnets. For example, a magnet that is in the first motor and that is close to the second motor uses a bipolar magnet, or a pair of magnets in some magnets that are disposed opposite to each other are bipolar magnets. This is not limited in this application.

Figure 12:
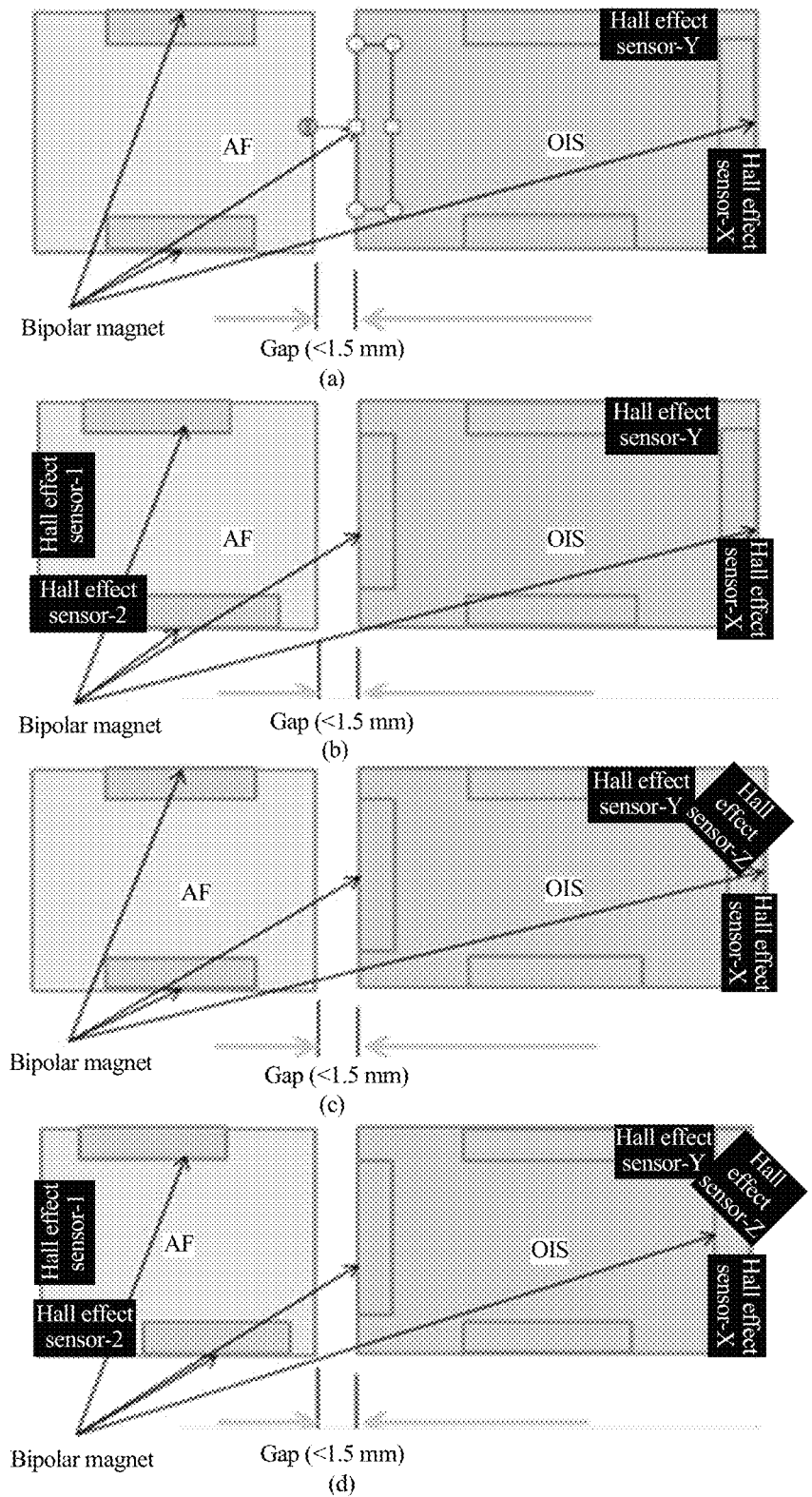
FIG. 12 is an elevational view of a motor structure of a dual-camera device according to still another embodiment of this application.

A dual-camera device including a first motor and a second motor may be shown in FIG. 12. It should be understood that a coil configured to support a magnet in a power-on state is disposed under a magnet in each second motor in FIG. 12.

As shown in (a) in FIG. 12, the first motor is an open-loop AF motor, and the open-loop AF motor includes two magnets. The second motor is an open-loop OIS motor, and the open-loop OIS motor includes four magnets and one Hall effect sensor (Hall-X and Hall-Y) in each of an X-axis direction and a Y-axis direction. All or some of the magnets in the open-loop AF motor and the magnets in the open-loop OIS motor may be bipolar magnets.

As shown in (b) in FIG. 12, the first motor is a closed-loop AF motor, and the closed-loop AF motor includes two magnets and two Hall effect sensors (Hall-1 and Hall-2) in a Z-axis direction. The second motor is an open-loop OIS motor, and the open-loop OIS motor includes four magnets and one Hall effect sensor (Hall-X and Hall-Y) in each of an X-axis direction and a Y-axis direction. All or some of the magnets in the closed-loop AF motor and the magnets in the open-loop OIS motor may be bipolar magnets. As shown in (c) in FIG. 12, the first motor is an open-loop AF motor, and the open-loop AF motor includes two magnets. The second motor is a closed-loop OIS motor, and the closed-loop OIS motor includes four magnets and one Hall effect sensor (Hall-X, Hall-Y, and Hall-Z) in each of an X-axis direction, a Y-axis direction, and a Z-axis direction. All or some of the magnets in the open-loop AF motor and the magnets in the closed-loop OIS motor may be bipolar magnets.

As shown in (d) in FIG. 12, the first motor is a closed-loop AF motor, and the closed-loop AF motor includes two magnets and two Hall effect sensors (Hall-1 and Hall-2) in a Z-axis direction. The second motor is a closed-loop OIS motor, and the closed-loop OIS motor includes four magnets and one Hall effect sensor (Hall-X, Hall-Y, and Hall-Z) in each of an X-axis direction, a Y-axis direction, and a Z-axis direction. All or some of the magnets in the closed-loop AF motor and the magnets in the closed-loop OIS motor may be bipolar magnets.

It should be understood that both the first motor and the second motor may be OIS motors. This is not limited in this application.

Optionally, a housing material of the second motor may also use a weak magnetic material or a non-magnetic material, so that magnetic interference caused by the second motor to the first motor is further reduced. For example, the housing material is SUS304 or SUS315.

It should be understood that a housing material of the first motor may be the same as or different from the housing material of the second motor.

Figure 13:
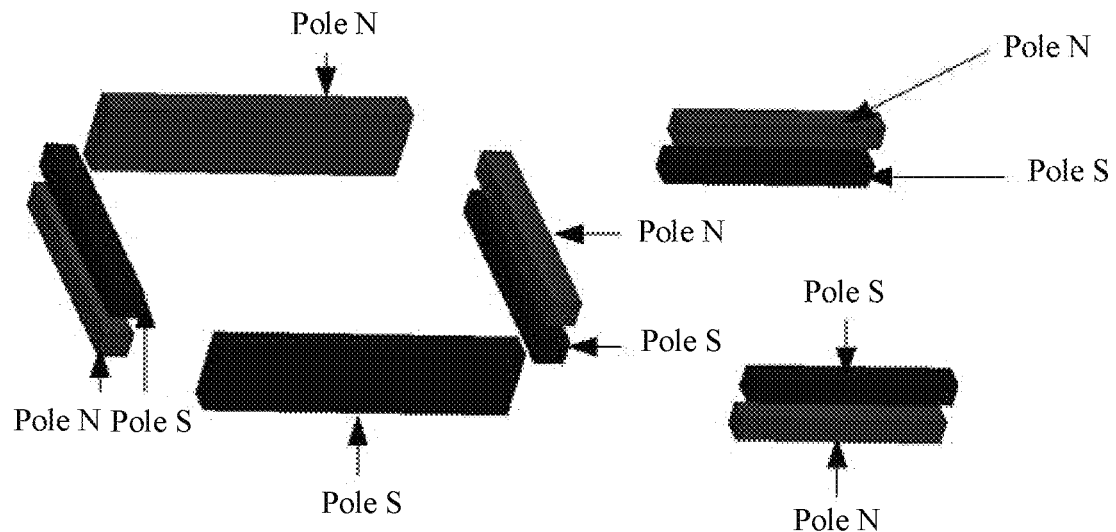
FIG. 13 is a layout diagram of bipolar magnets according to an embodiment of this application.
Figure 14:
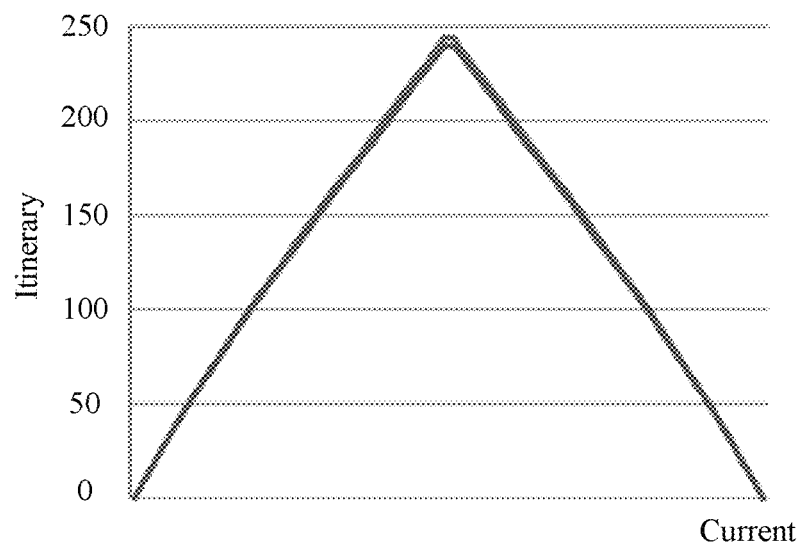
FIG. 14 is a diagram of a simulation result of magnetic interference according to an embodiment of this application.

An example in which a dual-camera device includes a closed-loop AF motor and a closed-loop OIS motor is used for description. FIG. 13 is a layout diagram of the magnets in the closed-loop AF motor and the magnets in the closed-loop OIS motor that are shown in (d) in FIG. 12. Some of the magnets in FIG. 13 are bipolar magnets. FIG. 14 is a simulation diagram of magnetic interference of a structural layout of the bipolar magnets shown in FIG. 13. FIG. 14 is a diagram of simulation results of magnetic interference of a single AF closed-loop motor, a single closed-loop OIS motor, and a closed-loop AF motor and a closed-loop OIS motor. It can be seen from the figure that three lines almost coincide. In other words, when the closed-loop AF motor and the closed-loop OIS motor are laid out as shown in FIG. 13 and magnets are configured as bipolar magnets, magnetic interference is relatively weak.

Therefore, for the dual-camera device in this embodiment of this application, the locations of the Hall effect sensors and the magnets are laid out in the two motors, bipolar magnets are used as the magnets, and the housing materials of the motors are changed to the weak magnetic material or the non-magnetic material. This reduces magnetic interference between the two motors, so that user experience is improved.

Optionally, an embodiment of this application provides a terminal device, including the dual-camera device according to any one of the foregoing implementations. The terminal device includes but is not limited to a mobile phone, a mobile station, a tablet computer, a digital camera, or the like. This is not limited in this application.

Specifically, when the terminal device is a mobile phone, the terminal device includes a dual-camera device, an image processing chip, a light sensitivity component, a display, and a battery. When the terminal device is a digital camera, the terminal device includes a dual-camera device, an image processing chip, a light sensitivity component, an aperture, a display, a battery, a shutter, and the like. Details are not described in this embodiment of this application.

It should be understood that a dual camera in this embodiment of this application may be two cameras on a back surface of a mobile phone that are disposed in parallel, or may be two cameras that are respectively disposed on a front surface and a back surface of a mobile phone. This is not limited in this application.

A person skilled in the art may clearly learn that for ease and briefness of description, specific working processes of the dual-camera device and the terminal device that are described above are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal device, comprising:
   a first camera, wherein the first camera comprises a first motor, and wherein the first motor comprises at least one first Hall effect sensor; and
   a second camera, wherein the second camera comprises a second motor,
   wherein the second motor and the first motor are disposed in parallel,
   wherein the second motor comprises N second coils and N second magnets,
   wherein the N second coils are configured to levitate and support the N second magnets during power-on,
   wherein N is a positive integer,
   wherein a distance between a first disposition location of the at least one first Hall effect sensor in the first motor and a second disposition location of the N second magnets in the second motor is greater than or equal to a first preset distance, and
   wherein the first preset distance is configured to reduce magnetic interference between the first motor and the second motor.

2. The terminal device of claim 1, wherein the first motor further comprises K first magnets and an autofocus (AF) coil, wherein the AF coil is in a ring shape, wherein the K first magnets are disposed opposite to each other along an outer wall of the ring shape, and wherein K is a positive integer.

3. The terminal device of claim 1, wherein the first motor further comprises M first coils and M first magnets, wherein the M first coils are configured to levitate and support the M first magnets during the power-on, wherein M is a positive integer, wherein the second motor further comprises at least one second Hall effect sensor, and wherein a distance between a third disposition location of the at least one second Hall effect sensor in the second motor and a fourth disposition location of the M first magnets in the first motor is greater than or equal to a second preset distance.

4. The terminal device of claim 3, wherein the first motor further comprises an autofocus (AF) coil, wherein the AF coil is in a ring shape, and wherein the M first magnets are disposed pairwise opposite to each other around an outer wall of the ring shape.

5. The terminal device of claim 3, wherein the second preset distance is a maximum distance between the third disposition location and the fourth disposition location.

6. The terminal device of claim 1, wherein the first preset distance is a maximum distance between the first disposition location and the second disposition location.

7. The terminal device of claim 1, wherein the second motor further comprises an autofocus (AF) coil, wherein the AF coil is in a ring shape, and wherein the N second magnets are disposed pairwise opposite to each other around an outer wall of the ring shape.

8. The terminal device of claim 1, wherein the first preset distance is based on sizes of internal space of the first motor and the second motor.

9. The terminal device of claim 1, wherein the first preset distance is based on measured data of the terminal device.

10. The terminal device of claim 1, wherein the first preset distance is less than or equal to a gap distance between the first disposition location and the second disposition location.

11. The terminal device of claim 10, wherein the gap distance is less than one and one half millimeters (mm).

12. The terminal device of claim 1, wherein the distance between the first disposition location and the second disposition location is a minimum distance between a location of the at least one first Hall effect sensor in the first motor and a location of the N second magnets in the second motor.

13. The terminal device of claim 1, wherein the first preset distance is less than or equal to a maximum distance achievable between the first disposition location and the second disposition location.

14. A dual-camera device, comprising:
   a first camera, wherein the first camera comprises a first motor, and wherein the first motor comprises at least one first Hall effect sensor; and
   a second camera, wherein the second camera comprises a second motor,
   wherein the second motor and the first motor are disposed in parallel,
   wherein the second motor comprises N second coils and N second magnets,
   wherein the N second coils are configured to levitate and support the N second magnets during power-on,
   wherein N is a positive integer,
   wherein a distance between a first disposition location of the at least one first Hall effect sensor in the first motor and a second disposition location of the N second magnets in the second motor is greater than or equal to a first preset distance, and
   wherein the first preset distance is based on a maximum distance between the first disposition location and the second disposition location, a size of internal space of the first motor and the second motor, measured data of the dual-camera device, or magnetic interference between the first motor and the second motor.

15. The dual-camera device of claim 14, wherein the first motor further comprises K first magnets and an autofocus (AF) coil, wherein the AF coil is in a ring shape, wherein the K first magnets are disposed opposite to each other along an outer wall of the ring shape, and wherein K is a positive integer.

16. The dual-camera device of claim 14, wherein the first motor further comprises M first coils and M first magnets, wherein the M first coils are configured to levitate and support the M first magnets during the power-on, wherein M is a positive integer, wherein the second motor further comprises at least one second Hall effect sensor, and wherein a distance between a third disposition location of the at least one second Hall effect sensor in the second motor and a fourth disposition location of the M first magnets in the first motor is greater than or equal to a second preset distance.

17. The dual-camera device of claim 16, wherein the first motor further comprises an autofocus (AF) coil, wherein the AF coil is in a ring shape, and wherein the M first magnets are disposed pairwise opposite to each other around an outer wall of the ring shape.

18. The dual-camera device of claim 16, wherein the second preset distance is a maximum distance between the third disposition location and the fourth disposition location.

19. The dual-camera device of claim 14, wherein the second motor further comprises an autofocus (AF) coil, wherein the AF coil is in a ring shape, and wherein the N second magnets are disposed pairwise opposite to each other around an outer wall of the ring shape.

* * * * *